United States Patent [19]
Maeda

[11] Patent Number: 5,337,367
[45] Date of Patent: Aug. 9, 1994

[54] RECORDING DEVICE AND VIDEO DEVICE USING THE SAME

[75] Inventor: Hiroyuki Maeda, Kyoto, Japan
[73] Assignee: Rohm Co., Ltd., Kyoto, Japan
[21] Appl. No.: 981,063
[22] Filed: Nov. 24, 1992
[30] Foreign Application Priority Data Nov. 26, 1991 [JP] Japan ................................. 3-336291

[51] Int. Cl.$^5$ ........................................... H04B 15/00
[52] U.S. Cl. ........................................... 381/94; 381/92
[58] Field of Search ................... 381/92, 94, 95, 122

[56] References Cited

U.S. PATENT DOCUMENTS 5,058,171 10/1991 Wurzer et al. .................... 381/92

Primary Examiner—Forester W. Isen
Attorney, Agent, or Firm—Fay, Sharpe, Beall, Fagan, Minnich & McKee

[57] ABSTRACT

A recording device comprising, a wind pressure sensor either foraged integral with the microphone or disposed at the vicinity of the microphone and detecting the wind pressure acting thereon; a recording circuit; a filter circuit which cuts off low sound components corresponding to the wind sound; a selection circuit which sends out the sound signal collected by the microphone to the recording circuit via the filter circuit in response to a control signal and, when no control signal is received, sends out the sound signal to the recording circuit while bypassing the filter circuit; and a control circuit which generates the control signal when the signal from the wind pressure sensor exceeds a predetermined level.

12 Claims, 3 Drawing Sheets

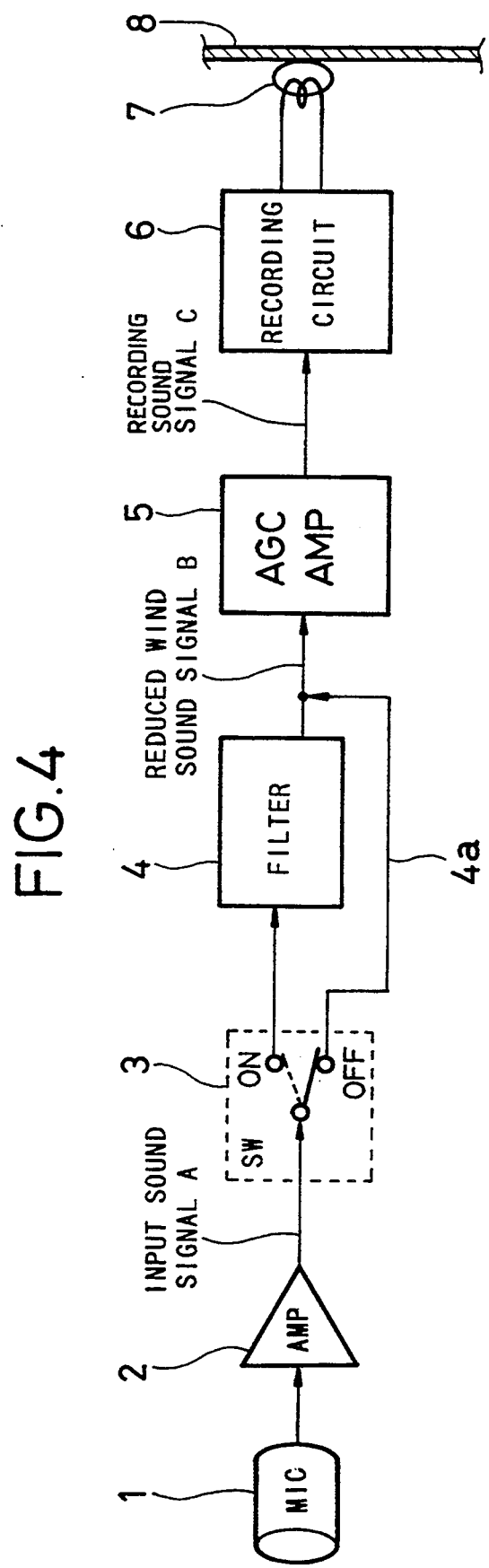

RECORDING DEVICE AND VIDEO DEVICE USING THE SAME

BACKGROUND OF THE INVENTION

1. Field of the Invention

The present invention relates to a recording device and a video device using the same, and, more specifically, relates to an improvement in a recording device, such as a camera integrated type video tape recorder and a video tape recorder (hereinafter simply called as VTR) which record sound signals (signals in audible frequencies) as well as images, and for audio devices such as a cassette tape recorder and a digital audio tape recorder (DAT) which only record audio signals, in which recording of unwanted wind sound encountered during recording in outdoors is suppressed.

2. Description of Related Art

FIG. 4 is a block diagram of a sound recording circuit in a conventional camera integrated type VTR. Numeral 1 is a microphone (MIC), numeral 2 is an amplifier (AMP) which amplifies a signal from the MIC and outputs the same as an input sound signal A, numeral 3 is a switch (SW) which selects whether the input sound signal is to be output toward a filter 4 or not, numeral 4 is the filter which receives the input sound signal A, numeral 5 is an AGC amplifier circuit (AGCAMP) which outputs a recording sound signal C upon receipt of the output from the filter 4 or the input sound signal A from the SW 3, numeral 6 is a recording circuit which receives the output (recording sound signal C) from the AGCAMP 5, numeral 7 is a magnetic head (hereinafter simply called as head) which records the sound signal on a video tape 8 upon receipt of the signal from the recording circuit 6, and numeral 8 is the video tape.

Upon receipt of the input sound signal A the filter 4 cuts components below for example 300 Hz out of the signal components and outputs the remaining components as a reduced wind sound signal B to the AGCAMP 5. The wind sound is a sound picked up by the microphone in a form of a sound signal corresponding to the wind pressure acting on the microphone. These wind sounds are noises such as hollow sounds like boco boco and rushing sounds like zaa zaa. Upon receipt of the input sound signal A or reduced wind sound signal B, the AGCAMP 5 AGC-controls the amplification rate so as to maintain the inputted signal level within a predetermined signal level and produces the recording sound signal C having a suitable level for recording.

In the sound recording circuit having the above constitution, the input sound signal A is produced by amplifying an electrical signal of the sound collected by the MIC 1. When there is no wind, the operator manipulates the SW 3 to select the side with no filter ("OFF" side), thereby the input sound signal A is sent out as it is to the AGCAMP 5 via a signal line 4a and the sound signal is recorded on the video tape 8 via the recording circuit 6 and the head 7.

When the operator feels wind sounds disturbing, the operator manipulates the SW 3 to select the side with filter ("ON" side). At this instance, the input sound signal A is sent toward the filter 4 and a low sound band below 300 Hz, in which wind sound components is contained in many amount, is cut off by the filter 4. The filtered signal as the reduced wind sound signal B is sent out to the AGCAMP 5 and the sound signal of which the low sound components are cut off is recorded on the video tape 8.

In such as camera integrated type VTR as explained in above, in order to achieve a clear sound collecting in outdoors even when there is a wind a part of wind sound components among the input sound signal A is cut off.

In the conventional constitution thus explained, when the operator notes the sound recording will be affected by the wind, the operator has to manually manipulate the SW 3 toward "ON", however when the operator is concentrating the picture taking the operator likely forgets to manipulate the SW 3. When the manipulation of the SW 3 is forgotten and the SW 3 is remained in "OFF" state, the collected sound affected by the wind is recorded and the noises such as hollow sounds like boco boco or rushing sounds like zaa zaa are superposed on the recorded sounds. On the other hand, when a picture taking is performed under the condition that the SW 3 is left in "ON" state in indoors where there is no influence of wind and human voice is the major sound source, the lower sound components in the collected sound are cut off and as a result there happens such instances that the collected sound is not clearly recorded.

Further, it is difficult to eliminate wind sound components generated by such as a gust even if recording is performed by cutting off the normal wind sound components from the sound signal. Still further, when a wind sound signal larger than a human voice is generated, the AGCAMP performs the AGC control with reference to the large wind sound signal, thereby there arises an inconvenience that the sound to be recorded is recorded in a smaller sound volume condition than the normal condition.

SUMMARY OF THE INVENTION

An object of the present invention is to realize a recording device which is designed to record sounds without caring wind pressures.

Another object of the present invention is to realize a recording device which is designed to cut off automatically wind sound components in response to the wind pressure while eliminating a change-over switch for cutting off wind sound components.

A further object of the present invention is to realize a video device which is designed to cut off automatically wind components in response to the wind pressure while eliminating a change-over switch for cutting off wind sound components.

A still further object of the present invention is to realize a video device which is designed to record sounds clearly in both outdoors and indoors.

The constitution of the recording device according to the present invention, which automatically detects a wind pressure and automatically performs the wind sound reduction processing, comprises a wind pressure sensor either formed integral with a MIC or disposed at the vicinity of the MIC and detecting the wind pressure acting thereon, a recording circuit, a filter circuit which cuts off low sound components corresponding to the wind sound, a selection circuit which sends out a sound signal collected by the MIC to the recording circuit via the filter circuit in response to a control signal and, when no control signal is received, sends out the sound signal to the recording circuit while bypassing the filter circuit and a control circuit which generates the control signal when the signal from the wind pressure sensor exceeds a predetermined level.

Further, a modified constitution of the above further comprises an AGC circuit, and the control circuit generates a band selection signal as the control signal and further generates a set signal which sets a lower gain limit of the AGC circuit, and the filter circuit includes a filter having a plurality of cutoff frequencies and is disposed in front of the AGC circuit. Still further, the selection circuit outputs the sound signal as it is when no band selection signal is received and, when the band selection signal is received, selects a filter having a cutoff frequency corresponding to the condition of the band selection signal out of the filters in response to the condition of the band selection signal. Moreover, the AGC circuit limits an excess suppression of the sound signal by setting a lower limit value in the gain range with the set signal.

With such provision of the automatic insertion and deinsertion of the filter based upon the detection of wind pressure, the recording device and video device according to the present invention records the sound picked up by the MIC as it is when there is no wind or weak wind which hits the device. In such instance, there is little influence of a wind and a clear recording is performed. Further, when the recording device is used in outdoors and a wind which hits the device is strong, the sound which is picked up by the MIC is not recorded as is, but through the insertion of the filter circuit the wind sound components in the sound signal containing many wind sound components are suppressed. Further, through the setting of a lower limit value in the gain range of the AGC circuit as explained above an excess suppression of the sound signal by the wind sound components is avoided.

Accordingly, the noises due to wind sounds are removed as well as an excess suppression of the signal level due to the influence of a wind is relaxed and a clear recording is relized in response to the places for the recording such as outdoors and indoors even when the places are changed.

BRIEF DESCRIPTION OF THE DRAWINGS

FIG. 4 is a block diagram of a sound recording circuit in a conventional camera integrated type VTR.

DESCRIPTION OF THE PREFERRED EMBODIMENT

Figure 1:
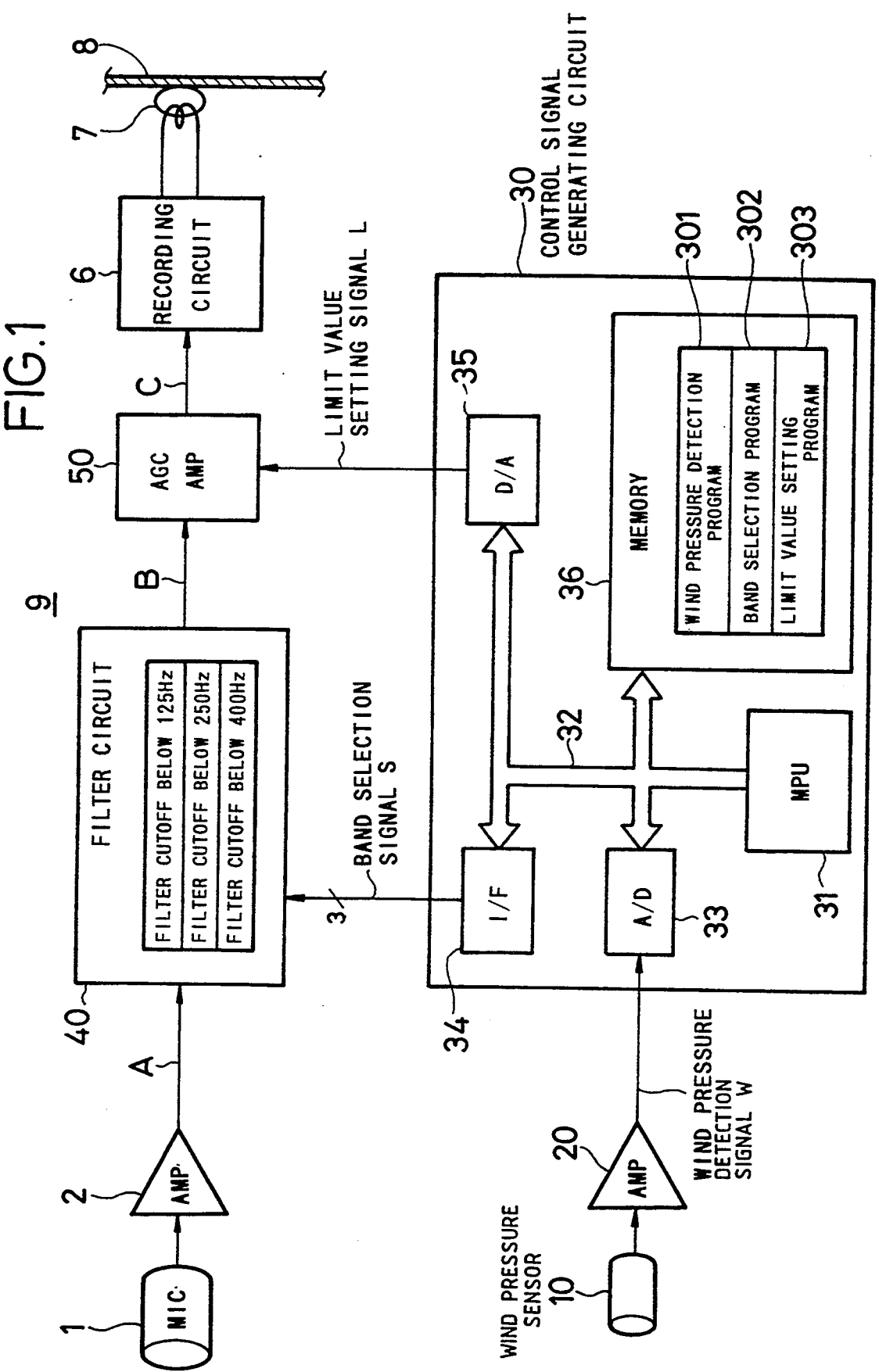
FIG. 1 is a block diagram of a sound recording circuit in a camera integrated type VTR, one embodiment of the recording devices according to the present invention.
Figure 3:
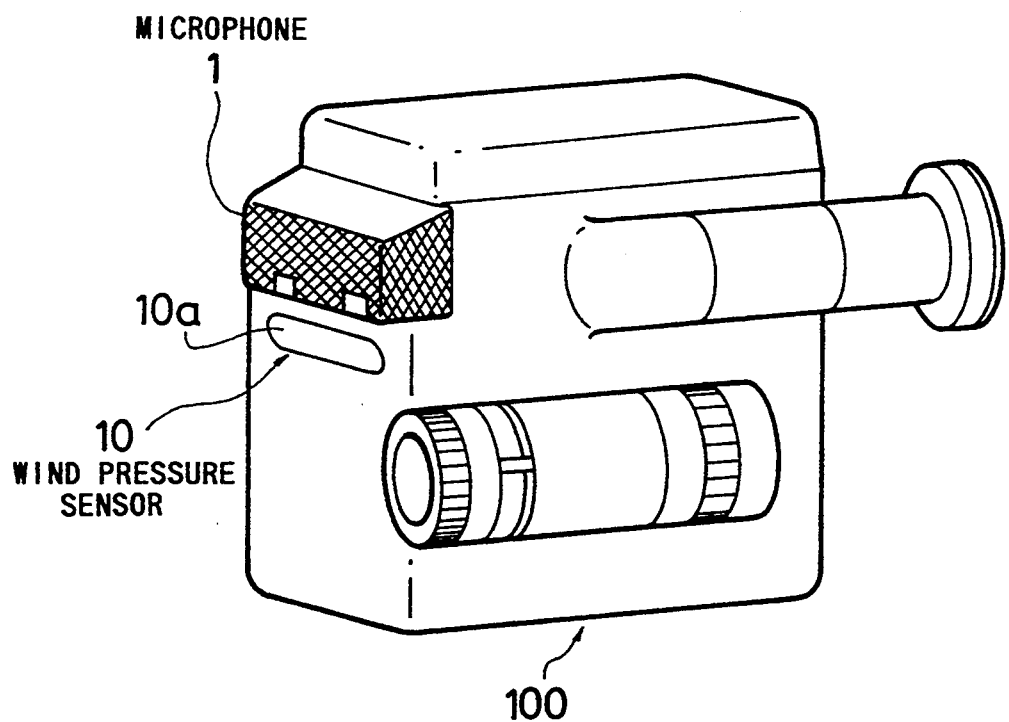
FIG. 3 is an outlook of the camera integrated type VTR shown in FIG. 1.

In FIG. 1, numeral 9 is a sound recording circuit which is disposed inside a camera integrated type VTR 100 illustrated in FIG. 3. Further, a MIC 1, AMP 2, recording circuit 6, head 7 and video tape 8 are the same as those in FIG. 4, the explanations thereof are omitted by assigning the same numerals.

Figure 2:
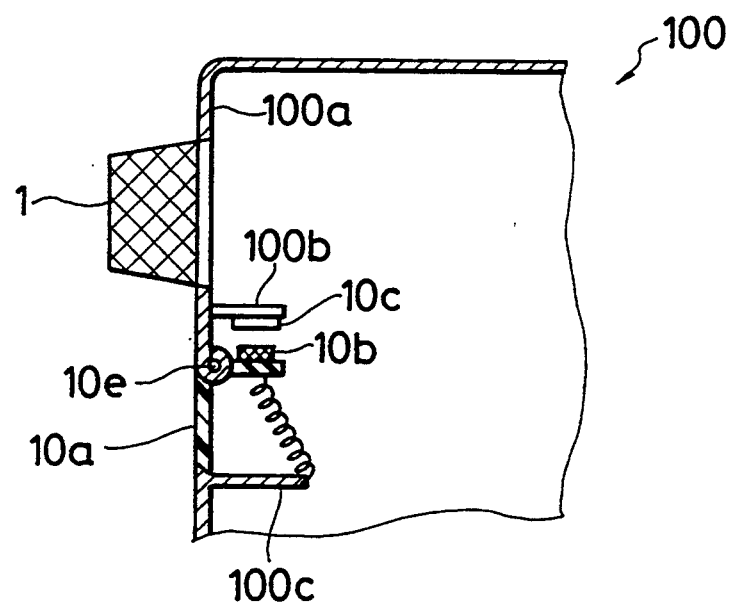
FIG. 2 is a cross sectional view illustrating a specific example of a wind pressure sensor.

Numeral 10 is a wind pressure sensor as illustrated in FIG. 2 which comprises an inverted L shaped wind pressure plate 10a and is attached to a box body 100a of the camera integrated type VTR at the bending point the L shaped member with a pin 10e in a state of an inverted L shape as to permit rotation toward the inside of the box body 100a. On the upper face of the upper portion of the inverted L shaped member a magnet 10b is provided and opposing to the magnet 10b a Hall element 10c is attached on the bracket 100b. The bracket is formed integral with the box body 100a and extends in a horizontal direction. A biasing spring is mounted between the top end of the inverted L shaped wind pressure plate 10a and the top end of a bracket 100c. The bracket 100c is also formed integral with the box body 100a and extends in the horizontal direction. The biasing spring biases the wind pressure plate 10a in such a manner that the wind pressure plate 10a is rotated to return in the original direction (in clockwise direction). Further, the lower portion of the wind pressure plate is slanted so that the slanted portion engages with the end of the box body 100a to prevent further rotation in the clockwise direction from the illustrated state.

When the wind pressure plate 10a is subjected to a wind pressure from the outside, the wind pressure plate 10a rotates in the counter-clockwise direction against the force of the spring and slants from the vertical direction by an angle in response to the wind pressure. In accordance with the slanted angle, the distance between the Hall element 10c and the magnet 10b reduces. Thereby an output is generated in the Hall element 10c and the output is sent out to a differential amplifier (AMP) 20. As a result, a signal corresponding to an increased output amount from a reference value is outputted from the AMP 20 as a wind pressure detection signal W.

As illustrated in the outlook of the camera integrated type VTR 100 in FIG. 3, the wind pressure plate 10a of the wind pressure sensor 10 is disposed at the vicinity of the MIC 1, thereby the wind pressure sensor 10 is constituted to locate at the vicinity of the MIC 1. Further a static wind pressure sensor with no movable member can be used wherein, for example, a current is continuously supplied to a resistance wire and based upon a varied current value due to resistance variation a wind pressure value is detected. Still further, a pressure sensor can be used for the wind pressure sensor and a piezolelectric film, for example, can be used as the pressure sensor.

The AMP 20 is a differential amplifier which receives a voltage signal generated in response to a wind pressure by the wind pressure sensor 10, amplifies the difference from a reference signal and outputs the same as the wind pressure detection signal W. Numeral 30 is a control signal generating circuit which controls a filter circuit 40 and a AGCAMP 50 respectively in response to the signal from the AMP 20, and, for this purpose, generates a band selection signal S and a limit value setting signal L respectively. The filter circuit includes a plurality of filters having a lower sound range cutoff characteristic with respect to the input signals and the respective cutoff characteristics are selected in response to the band selection signals S. Further, the amplification rate for the AGCAMP 50 is set at a lower limit value by the limit value setting signal L and is controlled so as not to decrease below the lower limit value. Thereby, an AGC control which prevents an output of an input sound signal below a predetermined level is performed.

The control signal generating circuit 30 generates a band selection signal S which either prevents cutoff of low frequencies or selects one of three low frequency cutoff characteristics dependent upon a wind pressure value representing a wind pressure signal W. Namely, when the wind pressure value corresponding to a wind pressure signal W is equal to or less than W1, the control signal generating circuit 30 generates, for example, 2 bit signal of "00" (one bit or plural bits can be used) as the band selection signal which prevents a low frequency cut off. When the wind pressure value corresponding to a wind pressure signal W is larger than W1 but equal to or less than W2, the control signal generating circuit 30 generates 2 bit signal of "01". When the wind pressure value corresponding to a wind pressure signal W is larger than W2 but is equal to or less than W3, 2 bit signal of "10" is generated. When the wind pressure value corresponding to a wind pressure signal W is larger than W3. 2 bit signal of "11" is generated. Wherein W1<W2<W3 and the logical value bit "1" in the band selection signal S is used as a switching signal for the filter circuit 40.

The control signal generating circuit 30 comprises a MPU 31, a bus line 32, and an A/D converter circuit (A/D) 33, an interface (I/F) 34 for outputting the band selection signal S, a D/A converter circuit (D/A) 35, and a memory 36 which are respectively connected to the MPU 31 via the bus line 32. Further the memory 36 stores such as a wind pressure detection program 301, a band selection program 302 and a limit value setting program 303.

The filter circuit 40 either generates a reduced wind sound signal B after cutting off low sound components in the received input sound signal A and outputs the same, or outputs the input sound signal A as it is without cutting off the low sound components as a reduced wind sound signal B. The cutting off of the low sound components is performed by selecting the filters in response to the values represented by the band selection signal S. The filters to be selected are one of a first filter which cuts off frequencies below 125 Hz, a second filter which cuts off frequencies below 250 Hz and a third filter which cuts off frequencies below 400 Hz. Further, when the band selection signal S is "00", the input sound signal A is outputted as it is as a reduced wind sound signal B. When the band selection signal S is "01", the first filter is selected and a signal in which signal components below 125 Hz in the input sound signal A are suppressed is outputted as a reduced wind sound signal B. Likewise, when the band selection signal S is "10", the second filter is selected and a signal in which signal components below 250 Hz in the input sound signal A are suppressed is outputted as a reduced wind sound signal B, and when the band selection signal S is "11", the third filter is selected and a signal in which signal components below 400 Hz in the input sound signal A is outputted as a reduced wind sound signal B. When the wind is strong the noise components at a high frequency region also become intense, therefore such constitution wherein one cutoff frequency among a plurality of cutoff frequencies is selectable is employed, thereby when the wind is weak frequencies below 125 Hz are cut off and when the wind is strong frequencies below 400 Hz are cut off. Since the cutoff frequencies are carefully switched, the noises due to a wind are properly removed and a clear recording is realized. Further, it is preferable to determine the values W1, W2 and W3 serving as references for selecting the low sound cutoff filters through experiments in view of the sensitivity of the wind pressure sensor 10 by collecting actual wind sounds and recording the same on the video tape 8.

Further, since the frequencies of electrical signals due to a wind sound are low, an AGC control which excessively reduces the gain in response to a wind sound level for low frequencies affected by a wind is likely to be performed. For preventing the above problem, the control signal generating circuit 30 generates a limit value setting signal L having a level depending upon the wind sound level, clamps the level L so that the control level of the AGC does not exceed the limit value setting signal L, and prevents a gain reduction below the limit.

The AGCAMP 50 receives the reduced wind sound signal B and amplifies the same, at this instance the amplification rate is controlled so that the output signal level is maintained within a predetermined signal level, thereby the recording sound signal C having a proper level is produced. Further, the AGCAMP 50 receives from the control signal generating circuit 30 a limit value setting signal L dependent upon a wind pressure, thereby the amplification rate of the AGCAMP 50 is set with a lower limit value so as not to decrease below a gain determined by the control level L. Thus the output level of the recording sound signal C is controlled. As a result, the lower limit amplification rate is increased or decreased dependent upon increase or decrease of a wind pressure value represented by a wind pressure signal W.

With the above provision, an excess suppression due to an AGC control on the recording sound signal C relating to the object sound signal is relaxed and a clear recording is realized. Further, the clamping of the AGC control level at a set value is performed by providing a clamp circuit in a feedback circuit generating an AGC control signal and setting the clamp voltage at the limit value setting signal L.

With the sound recording circuit thus constituted, the operator is required to exercise no care for a wind. Accordingly, the operator can simply take pictures without discriminating between indoors and outdoors with regard to the sound recording. A sound picked up by the MIC i is amplified by the AMP 2 to produce an input sound signal A, and at the same time, a wind pressure detected by the wind pressure detector 10 is amplified by the AMP 20 to produce a wind pressure signal W. Since the wind pressure detector 10 is provided immediately below the MIC 1, the wind pressure signal W can be treated in practice as representing a degree of noises due to a wind contained in an input sound signal A.

Therefore, the wind pressure detection program 301 detects a wind pressure based upon a wind pressure signal W obtained via the A/D converter circuit 33, and the band selection program 302 compares the detected wind pressure value with the values W1, W2 and W3 and judges in which ranges the value falls. Depending upon the judging result, one of band selection signals S of "00", "01", "10" and "11" is generated, and is outputted to the filter circuit 40 via the interface 34. The filters are selected in such a manner that, when the wind is weak the first signal "01" of the band selection signals S is outputted, when the strength of the wind is intermediate the second signal "10" of the band selection siganls S is outputted, and when the wind is strong the third signal "11" of the band selection signals S is outputted. Further, the band selection signal S of "00" represents no wind, in this instance no band selection signals S are outputted. When a band selection signal S is received at the filter circuit 40, cutoff frequencies are switched depending upon the band selection signal S and the noise components due to the wind are removed as has been explained in detail above.

Further, upon receipt of the wind pressure value the limit value setting program 303 produces a limit value setting signal L corresponding thereto. The generated limit value setting signal L is outputted to the AGCAMP 50 via the D/A converter circuit 35. Since the amplification rate of the AGCAMP 50 is controlled by feeding back the AGC control signal in such a manner that when the level of the AGC control signal is large the gain reduces accordingly, when a wind pressure value is small a limit value setting signal L setting a large AGC control level is produced so as to hardly limit the lower amplification rate limit of the AGCAMP 50, and when a wind pressure value is large wherein an AGC control is performed at a large control level, a limit value setting signal L is set at a smaller AGC control level than the above large control level so as not to reduce unnecessarily the gain of the AGCAMP 50 with respect to a sound signal. Thereby, when the wind pressure value is large, the lower limit of the gain control range for the AGCAMP 50 is limited and such a problem is avoided that the recording sound signal C is undesirably reduced due to an influence of a wind is avoided.

Hereinabove a specific example of camera integrated type VTR is explained, however the present invention is not limited thereto and the present invention is applicable in general to devices with a recording function of such as audio signals like audio devices such as cassette tape recorders and audio visual devices such as video tape recorders.

Further, in the present embodiment the control signal generating circuit 30 is constituted by a digital circuit having a microprocessor, however an analogue circuit can be used therefor.

Still further, in the present embodiment, the digital signals of e.g. two bits are used for the band selection signals S wherein upon receipt of the digital signals the cutoff frequencies in the filter circuit is switched, however analogue signals can be used for the band selection signals S wherein the filter circuit 40 can be constituted by an active filter having a variable cutoff frequency so as to continuously vary low band cutoff frequencies upon receipt of the analogue signal.

Still further, the limit value setting signal L for controlling the recording signal C can be varied continuously or in stepwise for the AGC control. In addition, in the present invention the control of the AGCAMP with the limit value setting signal L can be omitted.

Still further, other than disposing the wind pressure sensor at the vicinity of the MIC, the wind pressure sensor can be assembled integrally with the MIC.

I claim:

1. A recording device which selectively reduces wind sound components in a sound signal picked up by a microphone and records the same, comprising;
   a wind pressure sensor either formed integral with the microphone or disposed at the vicinity of the microphone and detecting the wind pressure acting thereon;
   a recording circuit;
   a filter circuit which cuts off low sound components corresponding to the wind sound components;
   a selection circuit which sends out the sound signal collected by the microphone to said recording circuit via said filter circuit in response to a control signal and, when no control signal is received, sends out the sound signal to said recording circuit while bypassing said filter circuit;
   a control circuit which generates the control signal when a signal from said wind pressure sensor exceeds a predetermined level;
   an AGC circuit including an AGC amplifier disposed in front of said recording circuit and wherein said filter circuit is disposed in front of said AGC circuit; and
   said control circuit setting a lower limit value of gain for said AGC amplifier in response to the wind pressure so as not to reduce the lower limit of the gain below a predetermined value.

2. A recording device according to claim 1, wherein said filter circuit includes a plurality of low range cutoff frequencies and said control circuit selects one of the plurality of low range cutoff frequencies in response to a signal level from said wind pressure sensor.

3. A recording device according to claim 1, wherein said control circuit generates the control signal to include a first and a second state;
   said selection circuit sends out the sound signal to said recording circuit, while bypassing said filter circuit, when receiving the control signal in the first state; and
   when receiving the control signal in the second state, said selection circuit sends out the sound signal collected by the microphone to said recording circuit via said filter circuit.

4. A recording device according to claim 3, wherein said filter circuit includes a plurality of filters having a low range cutoff frequency, said control circuit generates the second state to include a plurality of states, and said control circuit selects one of the plurality of filters dependent upon one of the plurality of states corresponding to a wind pressure value represented by a signal from said wind pressure sensor.

5. A recording device according to claim 4, wherein, when the wind pressure value represented by the signal from said wind pressure sensor is higher than a first predetermined value and is equal to or less than a second predetermined value the filter having a first cutoff frequency of which frequency is low among the plurality of low range cutoff frequencies is selected, and when the wind pressure value represented by a signal from said wind pressure sensor is higher than the second predetermined value, the filter having a second cutoff frequency which is higher than the first cutoff frequency is selected.

6. A video device including a recording device according to claim 1, further including a video camera integrated with said recording device.

7. A recording device which selectively reduces wind sound components in a sound signal picked up by a microphone and records the same, comprising;
   a wind pressure sensor either formed integral with the microphone or disposed at the vicinity of the microphone and detecting the wind pressure acting thereon;
   a recording circuit;
   a filter circuit which cuts off low sound components corresponding to the wind sound components;
   a selection circuit which sends out the sound signal collected by the microphone to said recording circuit via said filter circuit in response to a control signal and, when no control signal is received, sends out the sound signal to said recording circuit while bypassing said filter circuit;

a control circuit which generates the control signal when a signal from said wind pressure sensor exceeds a predetermined level; and said wind pressure sensor including a wind pressure plate which slants in response to a wind pressure from a vertical state and generates a signal in response to a slanted angle.

8. A recording device including a recording device according to claim 7, further including a video camera integrated with said recording device.

9. A recording device according to claim 7, wherein said filter circuit includes a plurality of low range cutoff frequencies and said control circuit selects one of the plurality of low range cutoff frequencies in response to a signal level from said wind pressure sensor.

10. A recording device according to claim 7, wherein said control circuit generates the control signal to include a first and a second state;
  said selection circuit sends out the sound signal to said recording circuit, while bypassing said filter circuit, when receiving the control signal in the first state; and
  when receiving the control signal in the second state, said selection circuit sends out the sound signal collected by the microphone to said recording circuit via said filter circuit.

11. A recording device according to claim 10, wherein said filter circuit includes a plurality of filters having a low range cutoff frequency, said control circuit generates the second state to include a plurality of states, and said control circuit selects one of the plurality of filters dependent upon one of the plurality of states corresponding to a wind pressure value represented by a signal from said wind pressure sensor.

12. A recording device according to claim 11, wherein, when the wind pressure value represented by the signal from said wind pressure sensor is higher than a first predetermined value and is equal to or less than a second predetermined value the filter having a first cutoff frequency of which frequency is low among the plurality of low range cutoff frequencies is selected, and when the wind pressure value represented by a signal from said wind pressure sensor is higher than the second predetermined value the filter having a second cutoff frequency which is higher than the first cutoff frequency is selected.

* * * * *